US012676437B2

(12) United States Patent
Wu

(10) Patent No.: US 12,676,437 B2
(45) Date of Patent: Jul. 7, 2026

(54) CONNECTOR STRUCTURE

(71) Applicants: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

(72) Inventor: Shang-Tsai Wu, New Taipei City (TW)

(73) Assignees: DINKLE ENTERPRISE CO., LTD., New Taipei City (TW); DINKLE ELECTRIC MACHINERY (CHINA) CO., LTD., Kunshan (CN); LI YANG ELECTRIC MACHINERY (DONGGUAN) CO., LTD., Dong Guan City (CN)

( * ) Notice: Subject to any disclaimer, the term of this patent is extended or adjusted under 35 U.S.C. 154(b) by 350 days.

(21) Appl. No.: 18/606,215

(22) Filed: Mar. 15, 2024

(65) Prior Publication Data

US 2025/0293448 A1 Sep. 18, 2025

(51) Int. Cl.
*H01R 13/08* (2006.01)
*H01R 13/422* (2006.01)

(52) U.S. Cl.
CPC ......... *H01R 13/08* (2013.01); *H01R 13/4223* (2013.01)

(58) Field of Classification Search
CPC ... H01R 13/08; H01R 13/4223; H01R 13/422
See application file for complete search history.

(56) References Cited

U.S. PATENT DOCUMENTS

| | | | | | |
|---|---|---|---|---|---|
| 4,597,620 | A * | 7/1986 | Lindner | H01R 13/5219 439/352 |
| 4,941,847 | A * | 7/1990 | Welsh | H01R 13/41 439/744 |
| 5,489,221 | A * | 2/1996 | Fujiura | H01R 13/41 439/869 |
| 2009/0011637 | A1 * | 1/2009 | Kim | H01R 13/6392 439/578 |

(Continued)

*Primary Examiner* — Gary F Paumen
(74) *Attorney, Agent, or Firm* — HDLS IPR SERVICES; Chun-Ming Shih

(57) ABSTRACT

A connector structure includes an insulating housing and a contact pin. The insulating housing includes a base seat and a hollow cylinder having a through slot and a limiting structure. The limiting structure includes a pair of opposite limiting surfaces and a pair of opposite limiting concave-arc surfaces. The contact pin is detachably inserted into the insulating housing and has a positioning section having a pair of opposite positioning surfaces and a pair of opposite positioning convex-arc surfaces. When the contact pin is not inserted into the insulating housing, a positioning spacing between the positioning convex-arc surfaces is greater than a limiting spacing between the limiting concave-arc surfaces. When the contact pin is inserted into the insulating housing, the positioning section is fixed in the limiting structure, the positioning surfaces and the positioning convex-arc surfaces are separately abutted against to the limiting surfaces and the limiting concave-arc surfaces.

10 Claims, 6 Drawing Sheets

(56) References Cited

U.S. PATENT DOCUMENTS

| | | | | |
|---|---|---|---|---|
| 2009/0269990 | A1* | 10/2009 | Yodogawa | H01R 13/2421 439/733.1 |
| 2011/0014822 | A1* | 1/2011 | Kato | H01R 13/65912 439/733.1 |
| 2011/0053404 | A1* | 3/2011 | Tsuruta | H01R 13/4365 439/345 |
| 2014/0154909 | A1* | 6/2014 | Arcykiewicz | H01R 13/20 439/350 |
| 2022/0384983 | A1* | 12/2022 | Iwamoto | H01R 13/4362 |

* cited by examiner

CONNECTOR STRUCTURE

BACKGROUND

Technical Field

The present disclosure relates to connector, particularly to an inserted connector structure.

Description of Related Art

Connectors are widely employed across various industrial, electronic, and technological fields. A connector primarily includes a connector plug and a connector socket that can be mutually inserted to each other. When they are engaged, they can establish a pathway for two circuits electrically connected to the connector plug and the connector socket respectively to facilitate electric current flow or transmission signals. There are various types of connectors, users are allowed to select different forms based on specific requirements. Among them, an inserted connector provides an insulating shell and a metal conductor in a form of insertion pin and fixed inside the insulating shell. Thus, one end of the pin is accommodated in a slot of the insulating shell to dock and electrically connect with a corresponding connector, and the other end of the pin is exposed outside of the insulating shell to connect to a wire, a cable, or a metal conductor to establish electrical connectivity. Therefore, after the pin is inserted into the insulating shell, the inserted connector needs to have anti-detachment structure to prevent connection failure in which the pin is detached from the insulating shell, and needs to maintain stability to ensure the stability of signal transmission instead of moving easily.

However, existing inserted connectors typically involve direct insertion of the pin into the insulating shell, this may lead the pin to wobble during practical use and cause poor contact or detachment. In addition, once the pin is inserted into the insulating shell, any pulling or hit on the wire, the cable, or the metal conductor connected to the exposed end of the pin outside the insulating shell may easily cause the pin to detach from the insulating shell, or cause the insulating shell to break inside, resulting in poor contact and electrical leakage. Furthermore, when the pin is inserted into the insulating shell, the insulating shell would generate a plurality of chips between the pin and the insulating shell because of softer hardness of the insulating shell, so that the pin would be obstructed due to the accumulation of the chips.

In view of the above, the inventor seeks to overcome the aforementioned drawbacks associated with the current technology and aims to provide an effective solution through extensive researches along with utilization of academic principles and knowledge.

SUMMARY

The primary objectives of the present disclosure are to prevent the contact pin from being invalidated due to wobbling or detaching when the contact pin insert into the insulating housing, and to prevent the contact pin from obstruction because of the accumulation of the chips generated by the insulating housing.

To accomplish the aforementioned objective, the present disclosure provides an insulating housing and a contact pin, the insulating housing comprises a base seat and a hollow cylinder connected to the base seat, the hollow cylinder defines a through slot and comprises a limiting structure, the through slot penetrates the base seat and the hollow cylinder along a vertical direction, the limiting structure is arranged on an end of the through slot, the limiting structure comprises a pair of limiting surfaces and a pair of limiting concave-arc surfaces, the limiting surfaces are parallel to each other and arranged oppositely, the limiting concave-arc surfaces are arranged oppositely and respectively connected to opposite sides of each of the limiting surfaces, the contact pin is configured to detachably insert to the insulating housing along the vertical direction, the contact pin comprises a inserted portion and an exposed portion, the inserted portion comprises a positioning section connected to the exposed portion, the positioning section comprises a pair of positioning surfaces and a pair of positioning convex-arc surfaces, the positioning surfaces are parallel to each other and arranged oppositely, the positioning convex-arc surfaces are arranged oppositely and respectively connected to opposite sides of each of the positioning surfaces, when the contact pin is not inserted into the insulating housing, a limiting spacing is defined between the limiting concave-arc surfaces, a positioning spacing is defined between the positioning convex-arc surfaces, the positioning spacing is greater than the limiting spacing, when the contact pin is inserted into the insulating housing, the inserted portion is inserted in the through slot, the positioning section is fixed in the limiting structure, each of the positioning surfaces is abutted against to each of the limiting surfaces, each of the positioning convex-arc surfaces is abutted against to each of the limiting concave-arc surfaces.

Another aspect of the present disclosure provides that a curvature of each of the limiting concave-arc surfaces is smaller than a curvature of each of the positioning convex-arc surfaces.

Another aspect of the present disclosure provides that one end of the hollow cylinder comprises a yielding slot, the yielding slot surrounds the limiting structure such that the hollow cylinder forms a surrounding wall between the yielding slot and the limiting structure, when the contact pin is inserted into the insulating housing, the positioning section is abutted against the limiting structure such that the surrounding wall is elastically deformed to collapse toward the yielding slot.

Another aspect of the present disclosure provides that the inserted portion comprises a stuck section and a plug section, the stuck section is connected between the positioning section and the plug section.

Another aspect of the present disclosure provides that the limiting structure further comprises a plurality of elastic hooks, the stuck section comprises an annular groove, when the contact pin is inserted into the insulating housing, the elastic hooks are latched to the annular groove.

Another aspect of the present disclosure provides that each of the elastic hooks comprises an elastic arm and a hook portion, the elastic arms are extended from an inner wall of the hollow cylinder, each of the hook portions is connected to a distal end of each of the elastic arms, when the contact pin is inserted into the insulating housing, the hook portions is abutted against to a side of the annular groove away from the positioning section along the vertical direction.

Another aspect of the present disclosure provides that the annular groove comprises a guiding slope, the guiding slope is located on a side of the annular groove adjacent to the positioning section.

Another aspect of the present disclosure provides that further comprises a step surface formed between the positioning section and the stuck section, the limiting structure further comprises a stopping surface, the stopping surface is perpendicular to the limiting surfaces, when the contact pin is inserted into the insulating housing, the step surface is abutted against to the stopping surface.

Another aspect of the present disclosure provides that an outer diameter of the positioning section is greater than an outer diameter of the stuck section.

Another aspect of the present disclosure provides that each of the limiting surfaces comprises a chip removal groove, the chip removal grooves are extended along the vertical direction.

Through the positioning spacing between the positioning convex-arc surfaces is greater than the limiting spacing between the limiting concave-arc surfaces when the contact pin is not inserted into the insulating housing, the positioning section of the contact pin with higher hardness is abutted against the limiting structure such that the hollow cylinder with lower hardness is deformed when the contact pin is inserted into the insulating housing, so that the positioning section of the contact pin may be fastened and fixed in the limiting structure of the insulating housing. Thus, the present disclosure can prevent the contact pin from failure due to wobbling or detaching of the contact pin, and to prevent the contact pin from obstruction because of the accumulation of the chips generated by the insulating housing.

DETAILED DESCRIPTION

Figure 1:
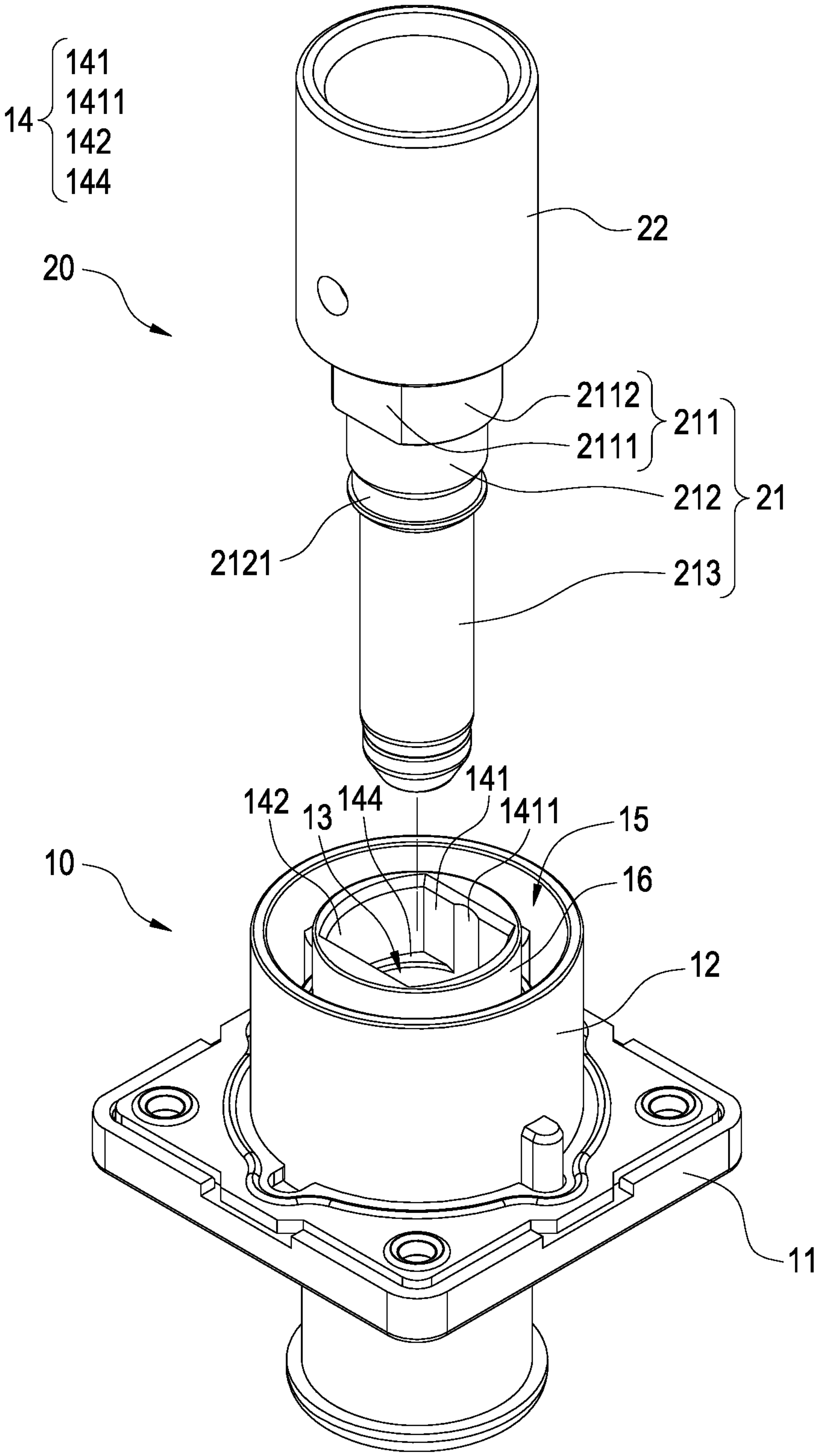
FIG. 1 is an exploded view of the present disclosure.
Figure 2:
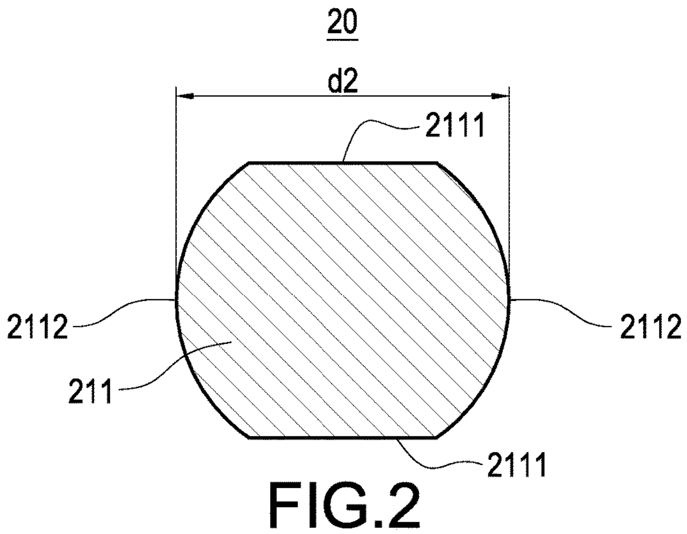
FIG. 2 is a cross-sectional top view of the positioning section of the contact pin of the present disclosure.

It is to be understood that the terms for indicating positions and the location relation, for example "front", "rear", "left", "right", "front end", "rear end", "distal end", "longitudinal direction", "lateral direction", "vertical direction", "top" and "bottom", are based on the positions and the location relation disclosed in the drawings, and only used for disclosing the present disclosure and not used for indicating or implying the specified location of the device or the components or the specified structure and operation in certain location, thus the present disclosure is not intended to be limiting.

As used herein and not otherwise defined, the terms "substantially" and "approximately" are used to describe and describe small changes. When used in connection with an event or situation, the terms may include the precise moment at which the event or situation occurs, as well as the event or situation occurring to a close approximation. For example, when combined with a numerical value, the terms may include a range of variation equal to or less than ±5% of the numerical value, such as equal to or less than ±4%, equal to or less than ±3%, equal to or less than ±2%, equal to or less than ±1%, equal to or less than ±0.5%, equal to or less than ±0.1%, or equal to or less than ±0.05%.

The technical contents of the present disclosure will become apparent with the detailed description of embodiments and the accompanied drawings as follows. However, it shall be noted that the accompanied drawings are for illustrative purposes only such that they shall not be used to restrict the scope of the present disclosure.

The present disclosure provides a connector structure, especially an inserted connector structure. As shown in FIGS. 1, 2, 3, and 4, the connector structure of the present disclosure includes an insulating housing 10 and a contact pin 20.

The insulating housing 10 is made of insulating material such as plastic. The insulating housing 10 includes a base seat 11 and a hollow cylinder 12. In the embodiment, the base seat 11 is a rectangular plate, but the present disclosure is not limited to this specific shape. For example, the base seat 11 may also be a plate or a block of other shapes. The hollow cylinder 12 is connected to the base seat 11. In the embodiment, the hollow cylinder 12 is connected to opposite sides of the base seat 11, namely connected to an upper side and a lower side of the base seat 11 shown in FIG. 5, but in another embodiment the hollow cylinder 12 may be arranged only on one side of the base seat 11. The hollow cylinder 12 defines a through slot 13 and has a limiting structure 14. As shown in FIG. 1, the through slot 13 penetrates the base seat 11 and the hollow cylinder 12 along a vertical direction in FIG. 1 to define a hollow space in the hollow cylinder. The limiting structure 14 is arranged on one end of the through slot 13. The limiting structure 14 is extended from an inner wall of the hollow cylinder 12 to achieve a limiting effect. The limiting structure 14 mainly includes a pair of limiting surfaces 141 and a pair of limiting concave-arc surfaces 142. The limiting surfaces 141 are parallel to each other and arranged oppositely. The limiting concave-arc surfaces 142 are arranged oppositely and respectively on opposite sides of the limiting surfaces 141, so that the limiting surfaces 141 and the limiting concave-arc surfaces 142 together form an ellipse shape when viewed from an insertion direction of the contact pin 20.

The contact pin 20 is made of conductive metal such as brass, phosphor bronze or pure copper. The contact pin 20 is detachably inserted corresponding to the insulating housing 10 along the vertical direction. The contact pin 20 includes an inserted portion 21 and an exposed portion 22. The inserted portion 21 has a positioning section 211, a stuck section 212, and a plug section 213. The positioning section is connected to the exposed portion 22. The stuck section 212 is connected between the positioning section 211 and the plug section 213. The exposed portion 22 may be fixed with a wire, a cable, or a metal conductor through being deformed by an external force or a fastening element such as bolts to establish an electrical connection. The positioning section 211 and the stuck section 212 are used to cooperate and fix with the limiting structure 14 of the insulating housing 10. The plug section 213 is used to contact a mating connector (not shown in figures) to form an electrical connection. In detail, a side edge of the positioning section 211 has a pair of positioning surfaces 2111 and a pair of positioning convex-arc surfaces 2112. The positioning surfaces 2111 are parallel to each other and arranged oppositely. The positioning convex-arc surfaces 2112 are arranged oppositely and respectively on opposite sides of the positioning surfaces 2111, so that the positioning surfaces 2111 and the positioning convex-arc surfaces 2112 together form an ellipse shape corresponding to the limiting structure 14 when viewed from an insertion direction of the contact pin 20.

Details are provided as follows. Please refer FIG. 2 and FIG. 3, a limiting spacing d1 is defined between the limiting concave-arc surfaces 142, and a positioning spacing d2 is defined between the positioning convex-arc surfaces 2112. The positioning spacing d2 is greater than the limiting spacing d1 when the contact pin 20 is not inserted into the insulating housing 10. Therefore, please refer FIGS. 5, 6, and 7, when the contact pin 20 is inserted into the insulating housing 10, the inserted portion 21 is inserted into the through slot 13, and the exposed portion 22 is exposed outside the insulating housing 10. The positioning section 211 is fastened and fixed in the limiting structure 14 so that the contact pin 20 does not easily wobble or is not easily detached from the insulating housing 10, which leads to failed connection with corresponding connector. In detail, since a hardness of the contact pin 20 is harder than a hardness of the insulating housing 10, the hollow cylinder 12 would be deformed when the contact pin 20 is inserted into the insulating housing 10. Thus, the positioning surfaces 2111 are respectively abutted against the limiting surfaces 141, and the positioning convex-arc surfaces 2112 are respectively abutted against the limiting concave-arc surfaces 142 such that the positioning section 211 is fastened and fixed in the limiting structure 14.

Figure 6:
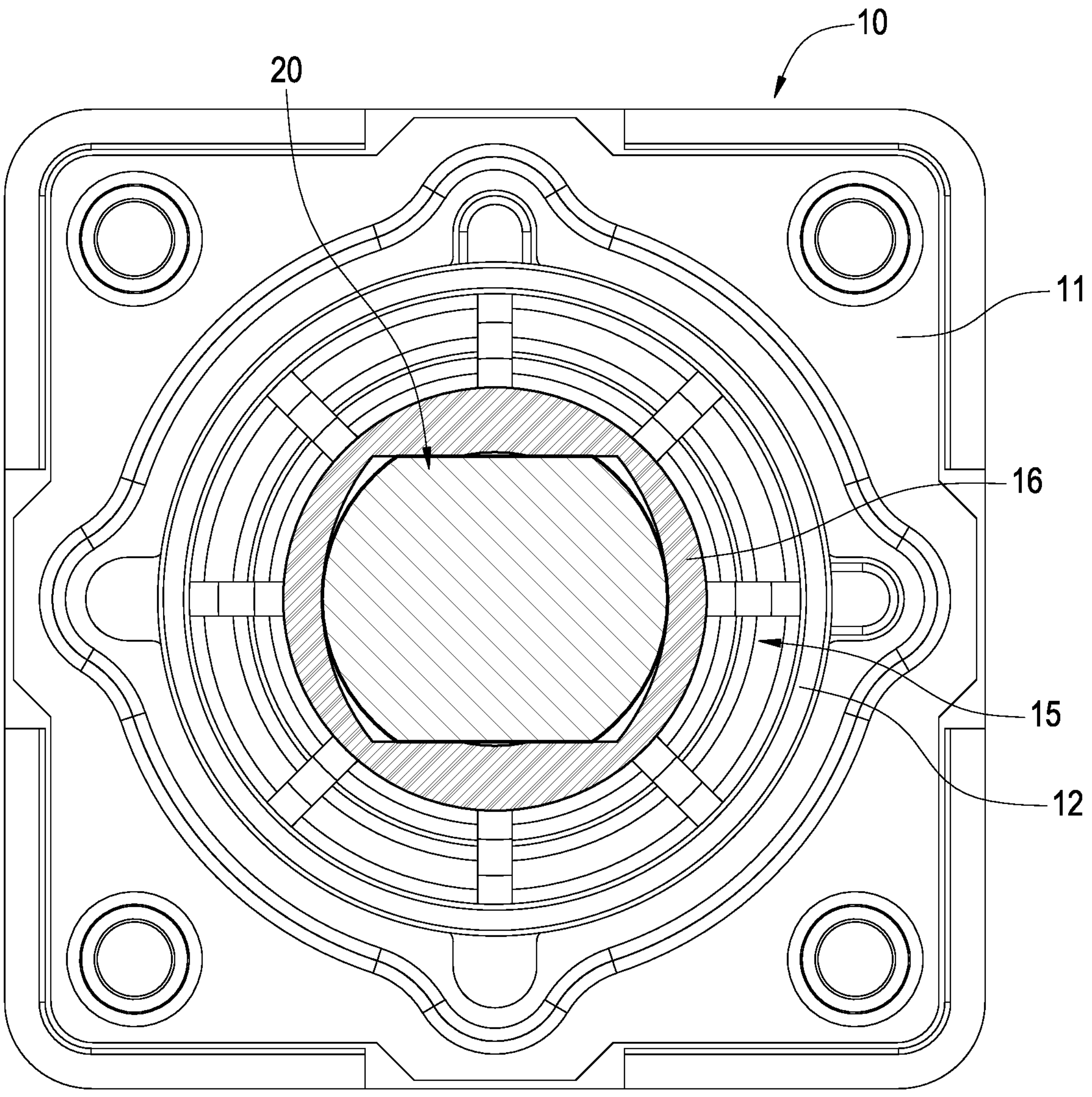
FIG. 6 is a cross-sectional top view of the present disclosure.
Figure 7:
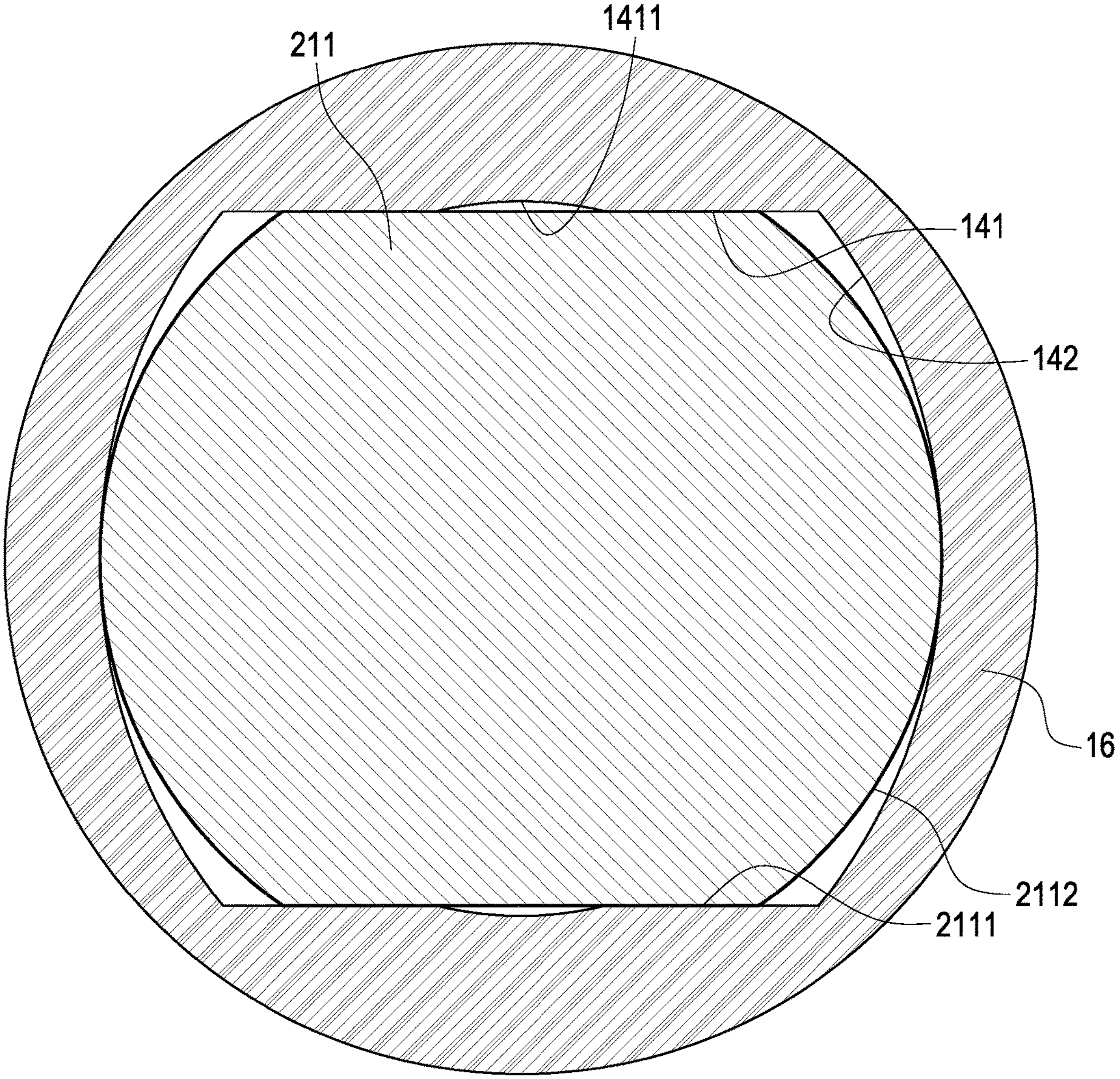
FIG. 7 is a partially enlarged view of FIG. 6.

Please refer FIG. 6 and FIG. 7, a curvature of each of the limiting concave-arc surfaces 142 is smaller than a curvature of each of the positioning convex-arc surfaces 2112. Therefore, when the inserted portion 21 is inserted into the through slot 13, the positioning convex-arc surfaces 2112 would not completely interfere with the limiting concave-arc surfaces 142 to cause excessive obstruction, and the most outwardly-curving portion of each of the positioning convex-arc surfaces 2112 would still be abutted against the most inwardly-curving portion of each of the limiting concave-arc surfaces 142 to cause the limiting structure 14 to deform and be fastened and fixed. It is worth noting that since the hardness of the contact pin 20 is harder than the hardness of the insulating housing 10, the chips generated by the positioning convex-arc surfaces 2112 abutting to and rubbing against the limiting concave-arc surfaces 142 may be discharged from four corners of the positioning section 211 when the contact pin 20 is inserted into the insulating housing 10, so that the contact pin 20 is prevented from obstruction due to the accumulation of the chips during the inserted process.

In addition, a distance between the limiting surfaces 141 is approximately equal to a distance between the positioning surfaces 2111. That is, the present disclosure does not specifically limit whether the distance between the limiting surfaces 141 is equal to the distance between the positioning surfaces 2111. As long as the difference between the two is within a certain variation range may effectively reduce a molding cost of the insulating housing 10 and a processing cost of the contact pin 20. Please refer FIGS. 1, 6, and 7, each of the limiting surfaces 141 has a chip removal groove 1411. Each of the chip removal groove 1411 is arranged on each of the limiting surfaces 141 and extended along the vertical direction. Therefore, when the distance between the limiting surfaces 141 is greater than the distance between the positioning surfaces 2111, the clips generated by the insulating housing 10 through the positioning surfaces 2111 abutting to and rubbing against the limiting surfaces 141 may be discharged from the chip removal groove 1411 to prevent the contact pin 20 from obstruction during the inserted process.

Figure 4:
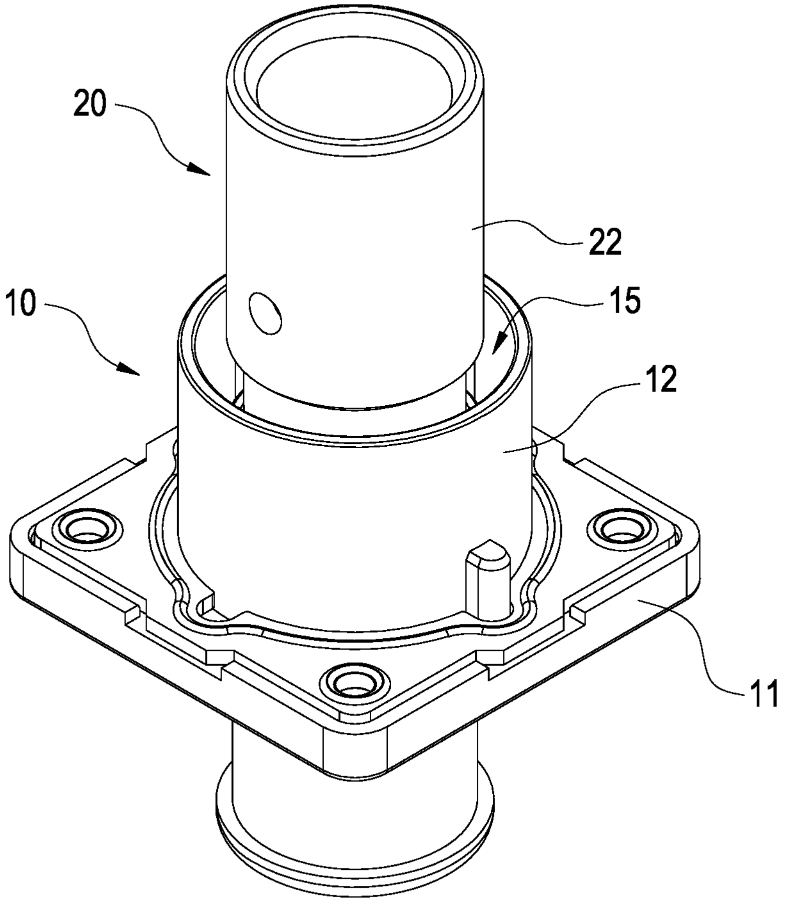
FIG. 4 is a perspective appearance view of the present disclosure.
Figure 5:
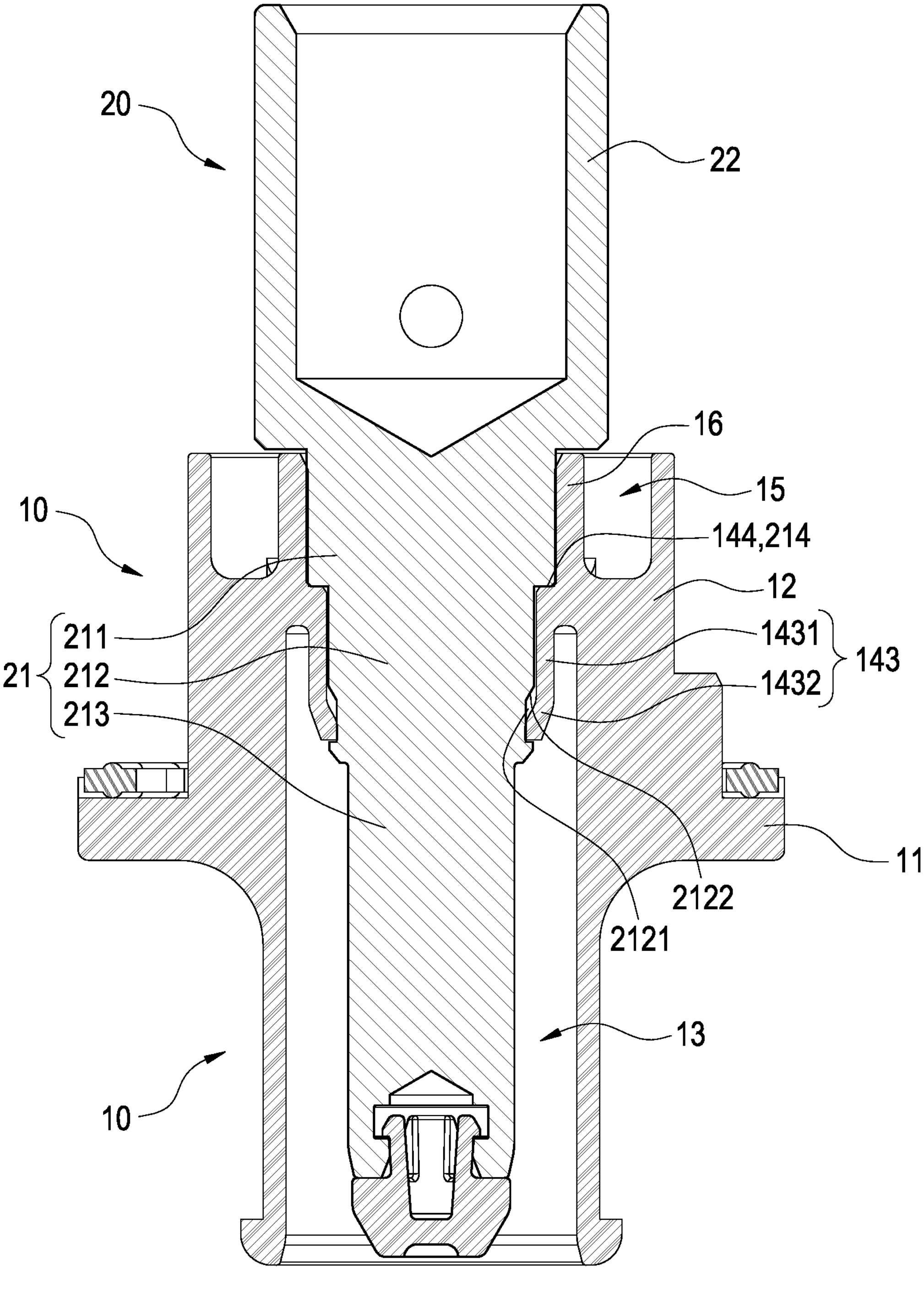
FIG. 5 is a cross-sectional side view of the present disclosure.

Please refer FIGS. 1, 4, and 5, one end of the hollow cylinder 12 defined a yielding slot 15. In detail, the yielding slot 15 surrounds an outside of the limiting structure 14 such that the hollow cylinder 12 forms a surrounding wall 16 between the limiting structure 14 and the yielding slot 15. That is, the surrounding wall 16 is a hollow cylindrical structure to limit the positioning section 211 of the contact pin 20 through the limiting structure 14. Therefore, when the positioning section 211 of the contact pin 20 is abutted against the limiting structure 14 of the insulating housing 10, since the hardness of the insulating housing 10 is lower than the hardness of the contact pin 20, the surrounding wall 16 would be elastically deformed to collapse toward the yielding slot 15 such that the positioning section 211 of the contact pin 20 is fixed into the limiting structure 14 of the insulating housing 10.

Figure 3:
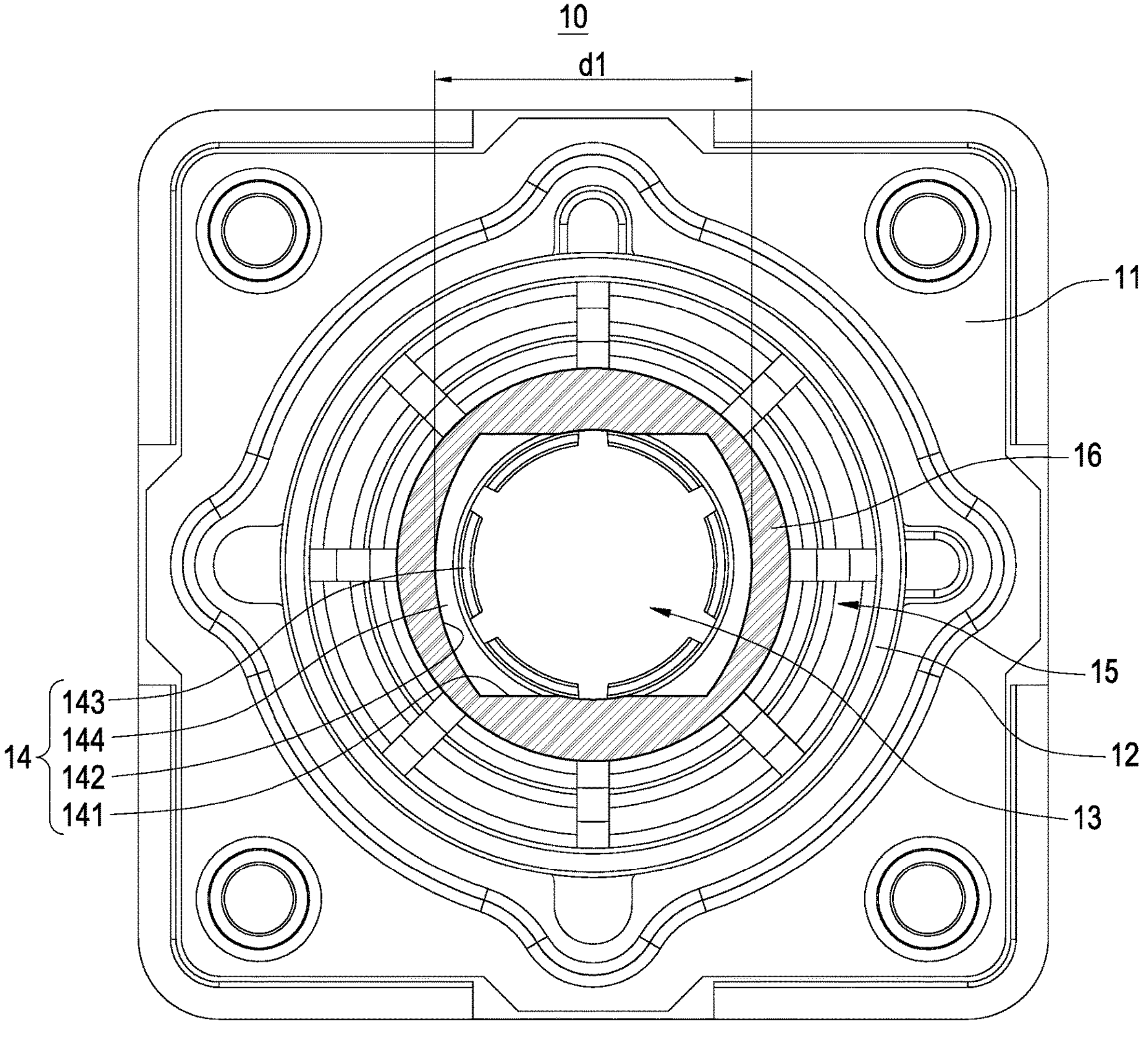
FIG. 3 is a cross-sectional top view of the insulating housing of the present disclosure.

Please refer FIGS. 1, 3, and 5, the limiting structure 14 further includes a plurality of elastic hooks 143, and an outer edge of the stuck section 212 has an annular groove 2121. When the contact pin 20 is inserted into the insulating housing 10, the elastic hooks 143 are latched to the annular groove 2121 to lock the contact pin 20 on the insulating housing 10. In detail, each of the elastic hooks 143 includes an elastic arm 1431 and a hook portion 1432. Each of the elastic arm 1431 is generally in an inverted L shape, and the elastic arms 1431 are extended from an inner wall of the hollow cylinder 12 along the vertical direction. Each of the hook portions 1432 is connected to a distal end of each of the elastic arms 1431, and the hook portions 1432 are arranged toward a central axis of the through slot 13. Therefore, when the contact pin 20 is inserted into the insulating housing 10, the hook portions 1432 are abutted against a side of the annular groove 2121 away from the positioning section 211 along the vertical direction. The annular groove 2121 has a guiding slope 2122. The guiding slope 2122 is located on a side of the annular groove 2121 adjacent to the positioning section 211, so that when the contact pin 20 is inserted into the insulating housing 10, the annular groove 2121 may guide the hook portions 1432 of the elastic hooks 143 to slide into the annular groove 2121 without getting stuck.

More particularly, an outer diameter of the positioning section 211 is greater than an outer diameter of the stuck section 212 to form a step surface 214 between the positioning section 211 and the stuck section 212. The limiting structure 14 further includes at least one stopping surface 144. In the embodiment, the number of the stopping surface 144 is two and the stopping surfaces 144 are correspondingly arranged at a bottom of each of the limiting concave-arc surfaces 142, but the number of the stopping surface 144 may also be one or more than three. The stopping surfaces 144 is perpendicular to the limiting surfaces 141. Therefore, when the contact pin 20 is inserted into the insulating housing 10 along the vertical direction, the step surface 214 of the contact surface 20 would be abutted against the stopping surfaces 144 of the limiting structure 14 to limit an insertion depth of contact pin 20.

Because the positioning spacing d2 between the positioning convex-arc surfaces 212 is greater than the limiting spacing d1 between the limiting concave-arc surfaces 142 when the contact pin 20 is not inserted into the insulating housing 10, the positioning section 211 of the contact pin 20 with higher hardness is abutted against the limiting structure 14 such that the hollow cylinder 12 with lower hardness is deformed when the contact pin 20 is inserted into the insulating housing 10, so that the positioning section 211 of the contact pin 20 may be fastened and fixed in the limiting structure 14 of the insulating housing 10. Thus, the connector structure of the present disclosure can prevent the contact pin 20 from failure due to wobbling or detaching of the contact pin 20, and to prevent the contact pin 20 from obstruction because of the accumulation of the chips generated by the insulating housing 10.

It shall be understood that the present disclosure may have other types of embodiments, and a person with ordinary skills in the art of the technical field of the present disclosure may make various changes and modifications corresponding to the present disclosure without deviating the principle and substance of the present disclosure; however, such corresponding changes and modification shall be considered to be within the claimed scope of the present disclosure.

What is claimed is:

1. A connector structure, comprising:

an insulating housing, comprising a base seat and a hollow cylinder connected to the base seat, the hollow cylinder defining a through slot and comprising a limiting structure, the through slot penetrating the base seat and the hollow cylinder along a vertical direction, the limiting structure arranged on an end of the through slot, the limiting structure comprising a pair of limiting surfaces and a pair of limiting concave-arc surfaces, the limiting surfaces parallel to each other and arranged oppositely, the limiting concave-arc surfaces arranged oppositely and respectively connected to opposite sides of each of the limiting surfaces; and a contact pin, configured to detachably insert to the insulating housing along the vertical direction, the contact pin comprising a inserted portion and an exposed portion, the inserted portion comprising a positioning section connected to the exposed portion, the positioning section comprising a pair of positioning surfaces and a pair of positioning convex-arc surfaces, the positioning surfaces parallel to each other and arranged oppositely, the positioning convex-arc surfaces arranged oppositely and respectively connected to opposite sides of each of the positioning surfaces;

wherein when the contact pin is not inserted into the insulating housing, a limiting spacing is defined between the limiting concave-arc surfaces, a positioning spacing is defined between the positioning convex-arc surfaces, the positioning spacing is greater than the limiting spacing;

wherein when the contact pin is inserted into the insulating housing, the inserted portion is inserted in the through slot, the positioning section is fixed in the limiting structure, each of the positioning surfaces is abutted against to each of the limiting surfaces, each of the positioning convex-arc surfaces is abutted against to each of the limiting concave-arc surfaces.

2. The connector structure according to claim 1, wherein a curvature of each of the limiting concave-arc surfaces is smaller than a curvature of each of the positioning convex-arc surfaces.

3. The connector structure according to claim 1, wherein one end of the hollow cylinder comprises a yielding slot, the yielding slot surrounds the limiting structure such that the hollow cylinder forms a surrounding wall between the yielding slot and the limiting structure, when the contact pin is inserted into the insulating housing, the positioning section is abutted against the limiting structure such that the surrounding wall is elastically deformed to collapse toward the yielding slot.

4. The connector structure according to claim 1, wherein the inserted portion comprises a stuck section and a plug section, the stuck section is connected between the positioning section and the plug section.

5. The connector structure according to claim 4, wherein the limiting structure further comprises a plurality of elastic hooks, the stuck section comprises an annular groove, when the contact pin is inserted into the insulating housing, the elastic hooks are latched to the annular groove.

6. The connector structure according to claim 5, wherein each of the elastic hooks comprises an elastic arm and a hook portion, the elastic arms are extended from an inner wall of the hollow cylinder, each of the hook portions is connected to a distal end of each of the elastic arms, when the contact pin is inserted into the insulating housing, the hook portions is abutted against to a side of the annular groove away from the positioning section along the vertical direction.

7. The connector structure according to claim 5, wherein the annular groove comprises a guiding slope, the guiding slope is located on a side of the annular groove adjacent to the positioning section.

8. The connector structure according to claim 4, further comprising a step surface formed between the positioning section and the stuck section, wherein the limiting structure further comprises a stopping surface, the stopping surface is perpendicular to the limiting surfaces, when the contact pin is inserted into the insulating housing, the step surface is abutted against to the stopping surface.

9. The connector structure according to claim 8, wherein an outer diameter of the positioning section is greater than an outer diameter of the stuck section.

10. The connector structure according to claim 1, wherein each of the limiting surfaces comprises a chip removal groove, the chip removal grooves are extended along the vertical direction.

* * * * *